(12) United States Patent
Isogai

(10) Patent No.: US 7,834,512 B2
(45) Date of Patent: Nov. 16, 2010

(54) AUTOMOTIVE ALTERNATOR INCLUDING ANNULAR CORE HAVING PROTRUSIONS AND RECESSES ALTERNATELY FORMED ON ITS OUTER SURFACE

(75) Inventor: Nobuo Isogai, Kariya (JP)

(73) Assignee: Denso Corporation, Kariya (JP)

( * ) Notice: Subject to any disclaimer, the term of this patent is extended or adjusted under 35 U.S.C. 154(b) by 0 days.

(21) Appl. No.: 12/314,410

(22) Filed: Dec. 10, 2008

(65) Prior Publication Data

US 2009/0152979 A1    Jun. 18, 2009

(30) Foreign Application Priority Data

Dec. 13, 2007    (JP) .............................. 2007-321942

(51) Int. Cl.
*H02K 1/22*    (2006.01)
*H02K 21/12*   (2006.01)
*H02K 17/42*   (2006.01)

(52) U.S. Cl. ............. 310/263; 310/156.66; 310/156.72; 310/156.73; 310/168

(58) Field of Classification Search .................. 310/263, 310/156.66, 156.72–156.73, 168
See application file for complete search history.

(56) References Cited

U.S. PATENT DOCUMENTS 6,424,073 B1 *    7/2002    Kometani et al. ........... 310/263
6,608,424 B2       8/2003    Kusase
6,680,557 B2 *    1/2004    Kusase ........................ 310/263
2007/0046137 A1    3/2007    Ooiwa
2007/0262672 A1 *  11/2007   Maekawa et al. ........... 310/263

FOREIGN PATENT DOCUMENTS

JP    B2 3785984    6/2006
JP    A 2007-68304  3/2007

\* cited by examiner

*Primary Examiner*—Quyen Leung
*Assistant Examiner*—Jose A Gonzalez Quinones
(74) *Attorney, Agent, or Firm*—Oliff & Berridge, PLC

(57) ABSTRACT

An automotive alternator is disclosed which includes an annular core disposed to surround the radially outer peripheries of all magnetic pole claws of magnetic pole cores. The annular core has, on an outer surface thereof, a plurality of protrusions, a plurality of recesses, and a plurality of slopes. Each of the protrusions is so provided as to be coincident with a corresponding one of the magnetic pole claws of the magnetic pole cores in the circumferential direction of a rotary shaft. Each of the recesses is alternately formed with the protrusions so as to be coincident with a corresponding one of air gaps formed between the magnetic pole claws of the magnetic pole cores in the circumferential direction. Each of the slopes is inclined to the radial direction of the rotary shaft and connects a circumferentially adjacent pair of one of the protrusions and one of the recesses.

7 Claims, 4 Drawing Sheets

← FRONT    REAR →

AUTOMOTIVE ALTERNATOR INCLUDING ANNULAR CORE HAVING PROTRUSIONS AND RECESSES ALTERNATELY FORMED ON ITS OUTER SURFACE

CROSS-REFERENCE TO RELATED APPLICATION

This application is based on and claims priority from Japanese Patent Application No. 2007-321942, filed on Dec. 13, 2007, the content of which is hereby incorporated by reference in its entirety into this application.

BACKGROUND OF THE INVENTION

1. Technical Field of the Invention

The present invention relates generally to automotive alternators for use in motor vehicles, such as passenger cars and trucks. More particularly, the invention relates to an automotive alternator which includes an annular core having protrusions and recesses alternately formed on its outer surface.

2. Description of the Related Art

In recent years, engine compartments in motor vehicles have been reduced to meet the requirements of adopting a slant-nose design to reduce the vehicle running resistance and securing a more sufficient space in the passenger compartment; thus, the spaces available for installation of automotive alternators in engine compartments have been accordingly reduced. Moreover, the rotational speed of engines and thus the rotational speed of automotive alternators have been lowered to improve the fuel economy. On the other hand, the number of automotive electrical devices, such as safety control devices, has been increased; thus, automotive alternators are now required to generate more electric power. That is to say, it is desired to provide automotive alternators that are compact, efficient, and powerful.

Furthermore, engine noises have recently been reduced to meet the social requirement of reducing vehicle outside noises and to improve the merchantability of vehicles by improving the quietness in the passenger compartments. Accordingly, the fan noises and magnetic noises of automotive alternators have become more noticeable.

On the other hand, an automotive alternator generally includes a pair of lundell-type magnetic pole cores (or rotor cores) each of which includes a plurality of magnetic pole claws. Therefore, in operation, a large iron loss will be induced in the magnetic pole claws due to fluctuation in magnetic flux transferred between the magnetic pole cores and a stator core that is arranged on the radially outer peripheries of the magnetic pole cores. Further, the magnetic pole claws, which are located on the radially outer side of a field winding, will generate loud wind noises during high-speed rotation thereof, impairing the quietness of the alternator and causing a large windage loss. Furthermore, since the magnetic pole claws expand radially outward during the high-speed rotation due to the centrifugal force, it is necessary to provide a sufficient air gap between the magnetic pole cores and the stator core. However, such an air gap will cause a large magnetoresistance between the magnetic pole cores and the stator core.

As relevant prior art, Japanese Patent No. 3785984, an English equivalent of which is U.S. Pat. No. 6,608,424 B2, discloses an automotive alternator which includes an annular core with an unrelieved outer surface. The annular core is disposed to surround the radially outer peripheries of all the magnetic pole claws of the magnetic pole cores, so as to reduce the iron loss induced in the magnetic pole claws.

Also as relevant prior art, Japanese Patent First Publication No. 2007-68304, an English equivalent of which is US 2007/0046137 A1, discloses a rotor for a rotary electric machine which includes a magnetic-pole cylindrical portion (or annular core) interposed between the side cores (or magnetic pole cores). The magnetic-pole cylindrical portion is so configured that it can be easily deformed during the assembly of the rotor, thereby preventing formation of any axial gap between itself and the side cores.

SUMMARY OF THE INVENTION

According to the present invention, there is provided an automotive alternator which includes a stator and a rotor. The stator includes a stator core and a stator winding wound around the stator core. The rotor is surrounded by the stator. The rotor includes a rotary shaft, a pair of first and second magnetic pole cores, a field winding, and an annular core. Each of the first and second magnetic pole cores has a hollow cylindrical boss portion, a disc portion, and a plurality of magnetic pole claws. The boss portion is fit on the rotary shaft so as to rotate along with the rotary shaft. The disc portion extends radially outward from an axially outer part of the boss portion. Each of the magnetic pole claws axially extends from a radially outer part of the disc portion. The magnetic pole claws of the first magnetic pole core are interleaved with the magnetic pole claws of the second magnetic pole core. The field winding is wound around both the boss portions of the first and second magnetic pole cores so that the field winding is surrounded by the boss portions, disc portions, and magnetic pole claws of the magnetic pole cores. The annular core is disposed to surround the radially outer peripheries of all the magnetic pole claws of the first and second magnetic pole cores. The annular core has, on an outer surface thereof, a plurality of protrusions, a plurality of recesses, and a plurality of slopes. Each of the protrusions is so formed and located as to be coincident with a corresponding one of the magnetic pole claws of the first and second magnetic pole cores in the circumferential direction of the rotary shaft. Each of the recesses is alternately formed with the protrusions so as to be coincident with a corresponding one of air gaps formed between the magnetic pole claws of the first and second magnetic pole cores in the circumferential direction of the rotary shaft. Each of the slopes is inclined to the radial direction of the rotary shaft and connects a circumferentially adjacent pair of one of the protrusions and one of the recesses.

With the annular core, it is possible to effectively reduce fluctuation in magnetic flux transferred between the rotor and the stator during rotation of the rotor. Consequently, it is possible to reduce the magnetic noises caused by the fluctuation in the magnetic flux, thereby improving the quietness of the alternator. Further, by providing the protrusions on the outer surface of the annular core, it is possible to reduce the radial air gap and thus the magnetoresistance between the rotor and the stator, thereby improving the efficiency of the alternator. Moreover, by providing the recesses on the outer surface of the annular core, it is possible to reduce leakage magnetic flux flowing inside the annular core in the circumferential direction of the rotary shaft, thereby increasing the output power of the alternator. Furthermore, by providing the slopes between the protrusions and the recesses, it is possible to further effectively reduce the fluctuation in the magnetic flux transferred between the rotor and the stator during rotation of the rotor.

In one preferred embodiment of the invention, the annular core is made of a laminate that is formed by laminating a plurality of soft magnetic lamination sheets in the axial direction of the annular core.

In another preferred embodiment of the invention, the annular core has, for each of the recesses, at least one through-hole that penetrates a wall portion of the annular core, which defines the bottom of the recess, in the axial direction of the annular core.

In yet another preferred embodiment of the invention, the rotor further includes a plurality of permanent magnets, each of which is interposed between a circumferentially adjacent pair of the magnetic pole claws of the first and second magnetic pole cores so as to reduce magnetic flux leakage between the pair of the magnetic pole claws.

It is preferable that wall portions of the annular core which respectively define the bottoms of the recesses have a lower magnetic permeability than wall portions of the annular core which respectively define the protrusions.

Preferably, each of the magnetic pole claws of the first and second magnetic pole cores tapers from the disc portion connecting therewith in the axial direction of the rotary shaft; each of the protrusions of the annular core also tapers in the same direction as the corresponding one of the magnetic pole claws of the first and second magnetic pole cores.

Preferably, the stator core has first and second groups of slots formed therein, and the stator winding comprises first and second stator windings. The slots of the first group are spaced in the circumferential direction of the rotary shaft at the same pitch as the magnetic pole claws of the first and second magnetic pole cores. The slots of the second group are spaced in the circumferential direction with a difference in electrical angle between each circumferentially adjacent pair of one of the slots of the first group and one of the slots of the second group being equal to 30°. The first stator winding is so wound around the stator core as to be received in the slots of the first group. The second stator winding is so wound around the stator core as to be received in the slots of the second group.

BRIEF DESCRIPTION OF THE DRAWINGS

The present invention will be understood more fully from the detailed description given hereinafter and from the accompanying drawings of preferred embodiments of the invention, which, however, should not be taken to limit the invention to the specific embodiments but are for the purpose of explanation and understanding only.

In the accompanying drawings.

Figure 1:
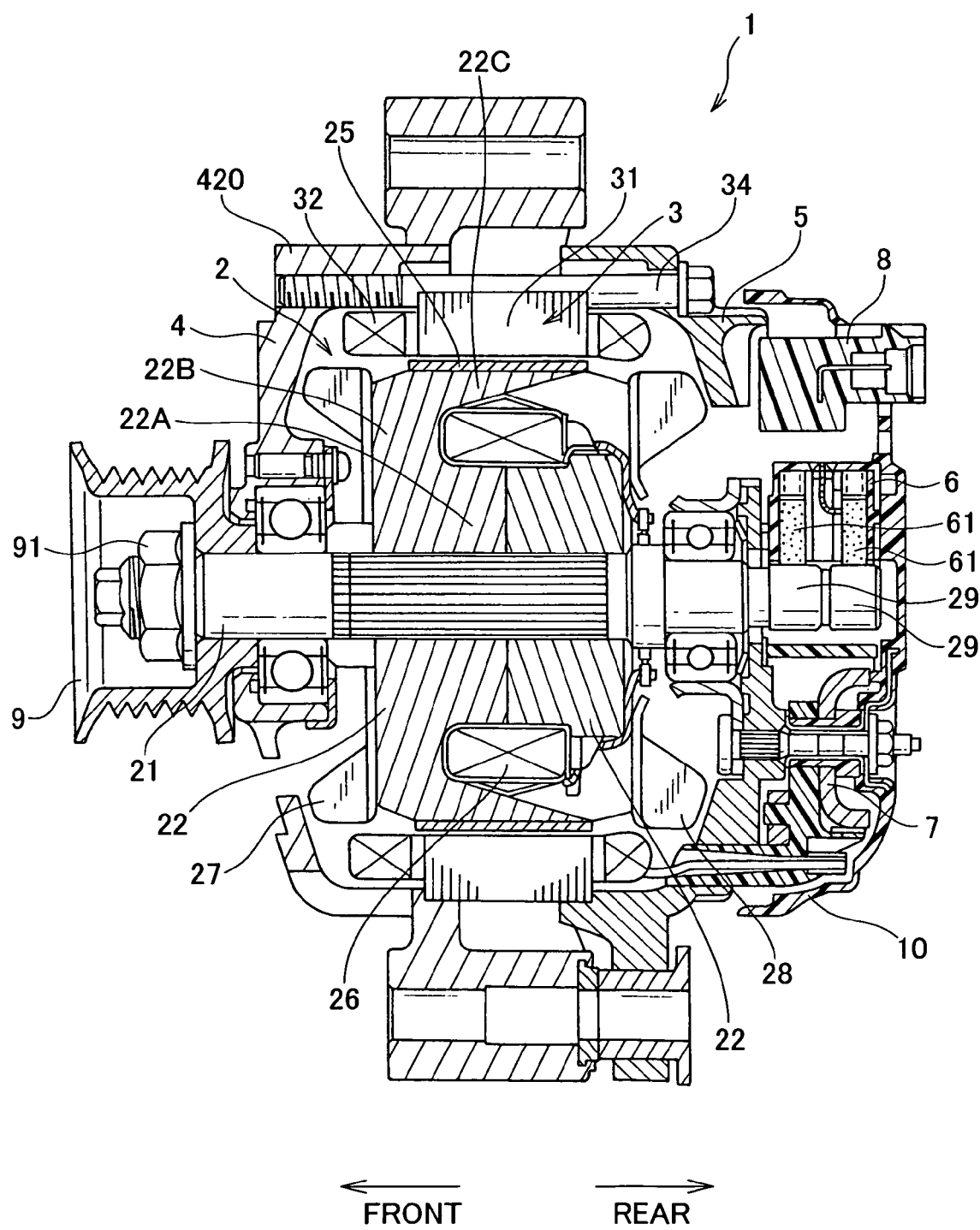
FIG. 1 is a partially cross-sectional view showing the overall configuration of an automotive alternator according to the first embodiment of the invention.

DESCRIPTION OF PREFERRED
EMBODIMENTS

Preferred embodiments of the present invention will be described hereinafter with reference to FIGS. 1-6.

It should be noted that, for the sake of clarity and understanding, identical components having identical functions in different embodiments of the invention have been marked, where possible, with the same reference numerals in each of the figures.

First Embodiment

FIG. 1 shows the overall configuration of an automotive alternator 1 according to the first embodiment of the invention. The alternator 1 is designed for use in a motor vehicle, such as a passenger car or a truck.

As shown in FIG. 1, the alternator 1 includes a rotor 2, a stator 3, a front housing 4, a rear housing 5, a brush assembly 6, a rectifier 7, a voltage regulator 8, a pulley 9, and a rear cover 10.

The rotor 2 includes a rotary shaft 21, a pair of first and second lundell-type magnetic pole cores 22, an annular core 25, a field winding 26, and cooling fans 27 and 28.

The rotary shaft 21 is rotatably supported by the front and rear housings 4 and 5. On a rear end portion of the rotary shaft 21, there is provided a pair of slip rings 29 that are electrically connected to opposite ends of the field winding 26, respectively.

Each of the first and second magnetic pole cores 22 has a hollow cylindrical boss portion 22A, a disc portion 22B, and a plurality of magnetic pole claws 22C. The boss portion 22A is serration-fit on the rotary shaft 21 so as to rotate along with the rotary shaft 21. The disc portion 22B is integrally formed with the boss portion 22A to extend radially outward from an axially outer part of the boss portion 22A. Each of the magnetic pole claws 22C is integrally formed with the disc portion 22B to axially extend from a radially outer part of the disc portion 22B.

The first and second magnetic pole cores 22 are assembled together with the magnetic pole claws 22C of the first magnetic pole core 22 interleaved with the magnetic pole claws 22C of the second magnetic pole core 22. Consequently, in the circumferential direction of the rotary shaft 21, the magnetic pole claws 22C of the first magnetic pole core 22 are alternately positioned with the magnetic pole claws 22C of the second magnetic pole core 22 at even intervals. In addition, in the present embodiment, the first magnetic pole core 22 is fit on the rotary shaft 21 more forward than the second magnetic pole core 22.

It should be noted that the boss portions 22A of the first and second magnetic pole cores 22 may also be integrally formed to make up a common boss portion 22A to the magnetic pole cores 22.

The annular core 25 is disposed radially outward of the first and second magnetic pole cores 22 to surround the magnetic pole claws 22C of the magnetic pole cores 22.

The field winding 26 is wound around both the boss portions 22A of the first and second magnetic pole cores 22, so that it is surrounded by the boss portions 22A, disc portions 22B, and magnetic pole claws 22C of the magnetic pole cores 22.

The cooling fan 27 is fixed, for example by welding, to a front end face of the first magnetic pole core 22. The cooling fan 27 sucks cooling air from the front side in the axial direction and discharges the same in both the axial and radial directions. On the other hand, the cooling fan 28 is fixed, for example by welding, to a rear end face of the second magnetic pole core 22. The cooling fan 28 sucks cooling air from the rear side in the axial direction and discharges the same in the radial direction.

The stator 3 includes a stator core 31 and a three-phase stator winding 32. The stator core 31 is disposed to surround the radially outer periphery of the rotor 2. The stator core 31 has a plurality of slots (not shown) formed therein, which are spaced in the circumferential direction of the rotary shaft 21 at predetermined intervals. The three-phase stator winding 32 is so wound around the stator core 31 as to be received in the slots of the stator core 31.

The front housing 4 and the rear housing 5 together support and accommodate therein both the rotor 2 and the stator 3 so that the rotor 2 can rotate about the rotary shaft 21, and the stator 3 surrounds the rotor 2 with a predetermined radial clearance therebetween. More specifically, the front and rear housings 4 and 5 each include a plurality of supporting portions 420 which are spaced in the circumferential direction of the rotary shaft 21 at predetermined intervals. A plurality of bolts 34 penetrate the supporting portions 420 in the axial direction of the rotary shaft 21, and are fastened to connect together the front and rear housings 4 and 5 with the stator 3 sandwiched therebetween.

The brush assembly 6 is provided to supply field current to the field winding 26 during rotation of the rotor 2. The brush assembly 6 includes a pair of brushes 61 that are respectively spring-loaded on the slip rings 29 to establish sliding contacts with them during rotation of the rotor 2.

The rectifier 7 is configured to rectify three-phase AC power output from the three-phase stator winding 32 of the stator 3 into DC power. In addition, part of the DC power is used as the field current to energize the field winding 26 of the rotor 2.

The voltage regulator 8 is configured to regulate the output voltage of the alternator 1 by controlling the field current supplied to the field winding 26.

The pulley 9 is mounted on a front end portion of the rotary shaft 21 by means of a nut 91, so that torque generated by an engine (not shown) of the vehicle can be transmitted to the rotor 2 via the pulley 9, thereby driving the rotor 2.

The rear cover 10 covers, from the rear side of the alternator 1, all of the brush assembly 6, the rectifier 7, and the voltage regulator 8, thereby protecting them from foreign matter.

With the above-described configuration of the alternator 1, when torque generated by the engine is transmitted to the pulley 9 via a belt (not shown), the rotor 2 is driven to rotate in a predetermined direction. Meanwhile, the field current is supplied to the field winding 26 through the sliding contacts between the brushes 61 and the slip rings 29, thereby magnetizing the first and second magnetic pole cores 22 and the annular core 25 to create a rotating magnetic field. The rotating magnetic field induces the three-phase AC power in the three-phase stator winding 32, which is further rectified by the rectifier 7 into DC power. The DC power is then output from the alternator 1, with the voltage thereof regulated by the voltage regulator 8.

Figure 3:
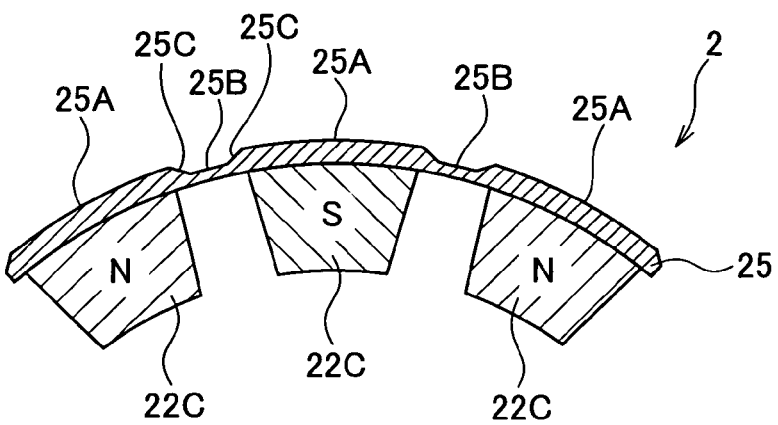
FIG. 3 is a cross-sectional view showing part of the rotor.

In addition, as shown in FIG. 3, when the field current is supplied to the field winding 26, the magnetic pole claws 22C of the first magnetic pole core 22 are magnetized to form north poles, while those of the second magnetic pole core 22 are magnetized to form south poles. Consequently, the formed north poles alternate with the formed south poles in the circumferential direction of the rotary shaft 21.

Figure 2:
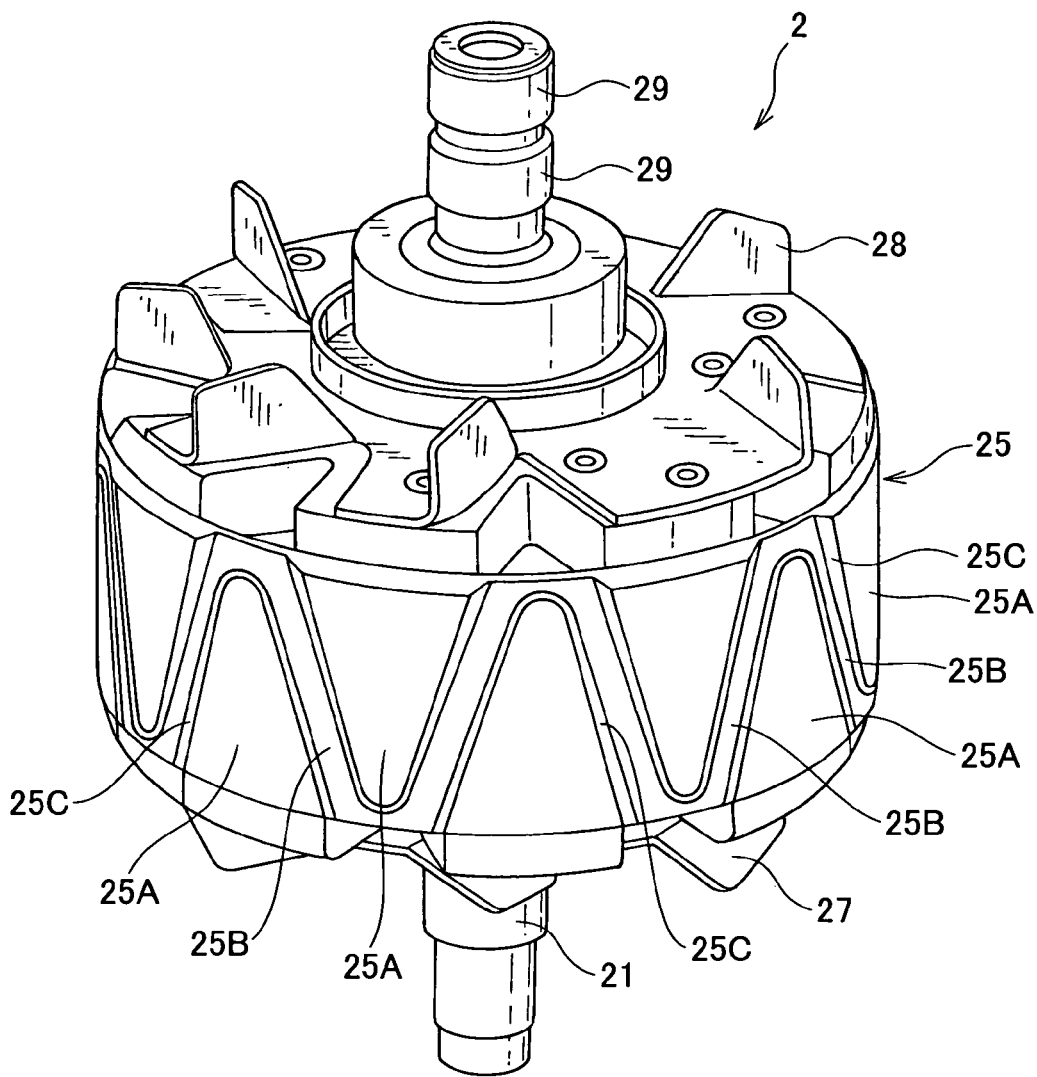
FIG. 2 is a perspective view of a rotor of the alternator.

Referring now to FIGS. 2 and 3, the detailed structure of the annular core 25 of the rotor 2 will be described hereinafter.

In the present embodiment, the annular core 25 has the shape of a hollow cylinder and is disposed to surround the radially outer peripheries of all the magnetic pole claws 22C of the first and second magnetic pole cores 22.

The annular core 25 has, on the outer surface thereof, a plurality of protrusions 25A, a plurality of recesses 25B, and a plurality of slopes 25C.

Each of the protrusions 25A is so formed and located as to be coincident with a corresponding one of the magnetic pole claws 22C of the magnetic pole cores 22 in the circumferential direction of the rotary shaft 21. More specifically, each of the protrusions 25A has, when projected onto the circumference of the annular core 25, the same profile as the corresponding magnetic pole claw 22C. Further, each of the protrusions 25A is located in the same position in the circumferential direction of the rotary shaft 21 as the corresponding magnetic pole claw 22C.

The recesses 25B are alternately formed with the protrusions 25A in the circumferential direction of the rotary shaft 21. Consequently, each of the recesses 25B is located in the same position in the circumferential direction of the rotary shaft 21 as a corresponding one of air gaps formed between the magnetic pole claws 22C of the first and second magnetic pole cores 22. In other words, each of the recesses 25B is coincident with the corresponding air gap in the circumferential direction of the rotary shaft 21.

Each of the slopes 25C is inclined to the radial direction of the rotary shaft 21 and connects a circumferentially adjacent pair of one of the protrusions 25A and one of the recesses 25B.

In the present embodiment, each of the magnetic pole claws 22C of the first and second magnetic pole cores 22 tapers from the disc portion 22B connecting therewith in the axial direction of the rotary shaft 21. Accordingly, each of the protrusions 25A of the annular core 25 also tapers in the same direction as the corresponding one of the magnetic pole claws 22C of the magnetic pole cores 22.

Further, in the present embodiment, the annular core 25 has an unrelieved inner surface having a predetermined diameter. Therefore, the thickness of the annular core 25 is thicker at the protrusions 25A than at the recesses 25B.

Moreover, the annular core 25 has a length in the axial direction of the rotary shaft 21 greater than or equal to that of the stator core 31 which faces the outer surface of the annular core 25.

The annular core 25 is fixed to the magnetic pole claws 22C of the first and second magnetic pole cores 22 by either or both of welding and shrinkage fit.

In addition, the annular core 25 may be formed by: 1) forming the protrusions 25A, recesses 25B, and slopes 25C on one surface of a flat plate; 2) bending the flat plate into a ring with the protrusions 25A, recesses 25B, and slopes 25C on the outer surface; and 3) joining together both ends of the ring by welding or crimping. Alternatively, it is also possible to bend the flat plate while fixing it to the magnetic pole claws 22C of the magnetic pole cores 22 by, for example, welding.

In assembling the rotor 2, the annular core 25 can be positioned with respect to the magnetic pole cores 22 by: 1) forming step portions in all or part of the magnetic pole claws 22C of one of the magnetic pole cores 22; 2) forming mating step portions in the annular core 25; and 3) fitting the step portions formed in the magnetic pole claws 22c to the mating step portions formed in the annular core 25, respectively.

The above-described automotive alternator 1 according to the present embodiment has the following advantages.

In alternator 1, the annular core 25 of the rotor 2 has the protrusions 25A, recesses 25B, and slopes 25C formed on the outer surface thereof. Each of the protrusions 25A is so provided as to be coincident with a corresponding one of the magnetic pole claws 22C of the first and second magnetic pole cores 22. Each of the recesses 25B is so provided as to be coincident with a corresponding one of the air gaps formed between the magnetic pole claws 22C of the first and second magnetic pole cores 22. Each of the slopes 25c is inclined to the radial direction of the rotary shaft 21 and connects a circumferentially adjacent pair of one of the protrusions 25A and one of the recesses 25B.

With the above annular core 25, it is possible to effectively reduce fluctuation in magnetic flux transferred between the rotor 2 and the stator 3 during rotation of the rotor 2. Consequently, it is possible to reduce the magnetic noise caused by the fluctuation in the magnetic flux, thereby improving the quietness of the alternator 1.

Further, by providing the protrusions 25A on the outer surface of the annular core 25, it is possible to reduce the radial air gap and thus the magnetoresistance between the rotor2 and the stator 3, thereby improving the efficiency of the alternator 1. Moreover, by providing the recesses 25B on the outer surface of the annular core 25, it is possible to reduce leakage magnetic flux flowing inside the annular core 25 in the circumferential direction of the rotary shaft 21, thereby increasing the output power of the alternator 1. Furthermore, by providing the slopes 25C between the protrusions 25A and the recesses 25B, it is possible to further effectively reduce the fluctuation in the magnetic flux transferred between the rotor 2 and the stator 3 during rotation of the rotor 2.

In the present embodiment, each of the magnetic pole claws 22C of the first and second magnetic pole cores 22 tapers from the disc portion 22B connecting therewith in the axial direction of the rotary shaft 21. Thus, each of the protrusions 25A of the annular core 25 also tapers in the same direction as the corresponding one of the magnetic pole claws 22C of the magnetic pole cores 22.

With the above configuration, it is possible to further effectively reduce the fluctuation in the magnetic flux transferred between the rotor 2 and the stator 3 during rotation of the rotor 2. Consequently, it is possible to further effectively reduce the magnetic noises caused by the fluctuation in the magnetic flux, thereby further improving the quietness of the alternator 1.

Second Embodiment

Figure 4:
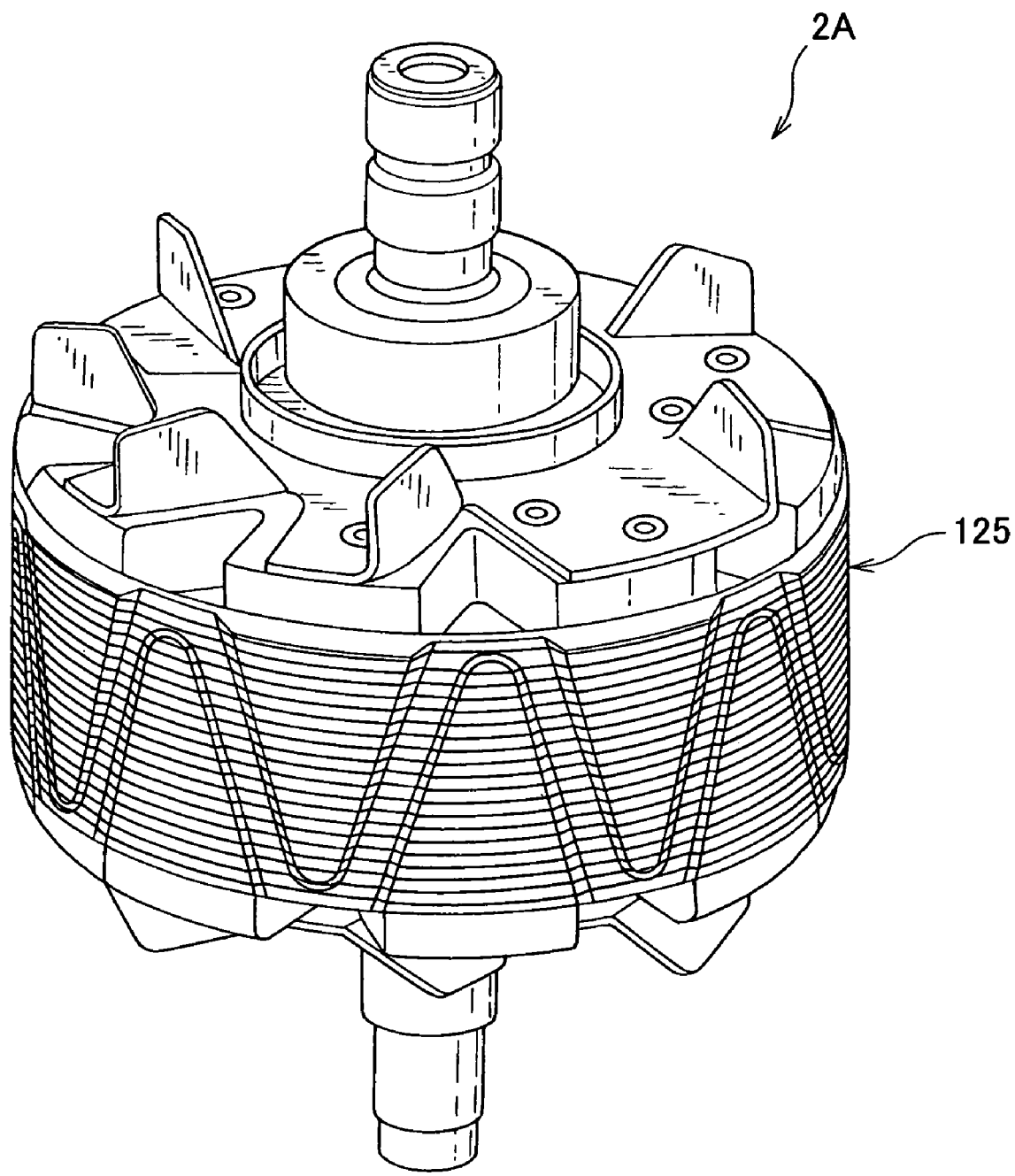
FIG. 4 is a perspective view of a rotor according to the second embodiment of the invention.

FIG. 4 shows a rotor 2A according to the second embodiment of the invention.

As shown in FIG. 4, the rotor 2A includes, instead of the annular core 25 of the first embodiment, an annular core 125.

The annular core 125 is made of a laminate that is formed by laminating a plurality of soft magnetic lamination sheets in the axial direction of the annular core 125 (i.e., in the axial direction of the rotary shaft 21).

With the above formation of the annular core 125, it is possible to reduce eddy current induced in the annular core 125, thereby improving the efficiency of the alternator 1.

Third Embodiment

Figure 5:
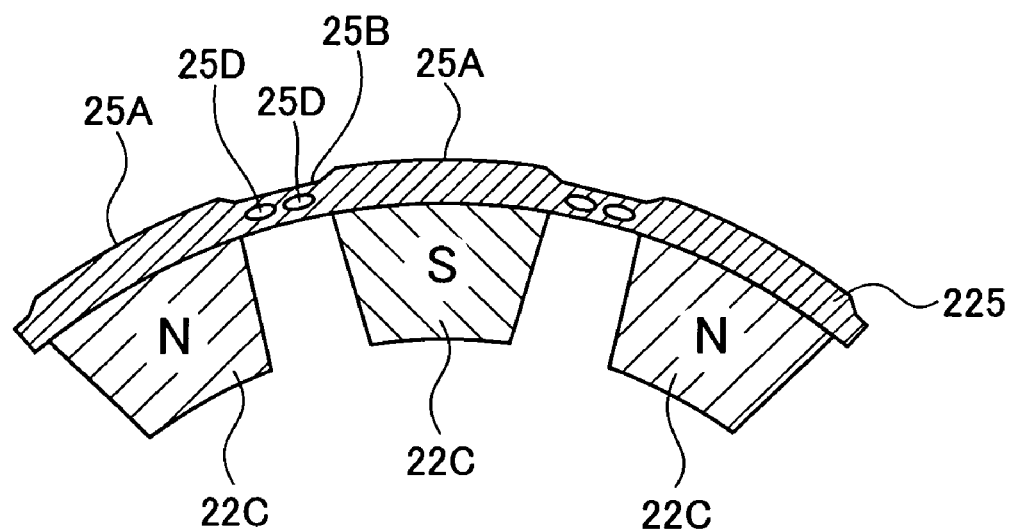
FIG. 5 is a cross-sectional view showing part of an annular core according to the third embodiment of the invention.

FIG. 5 shows part of an annular core 225 according to the third embodiment of the invention.

As shown in FIG. 5, the annular core 225 has, for each of the recesses 25B, two through-holes 25D that penetrate a wall portion of the annular core 225, which defines the bottom of the recess 25B, in the axial direction of the annular core 225 (i.e., in the axial direction of the rotary shaft 21).

With the through-holes 25D, it is possible to further effectively reduce the leakage magnetic flux flowing inside the annular core 225 in the circumferential direction of the rotary shaft 21, thereby further increasing the output power of the alternator 1.

In addition, it should be noted that the annular core 225 may have a different number of the through-holes 25D for each of the recesses 25B, for example one or three.

Fourth Embodiment

Figure 6:
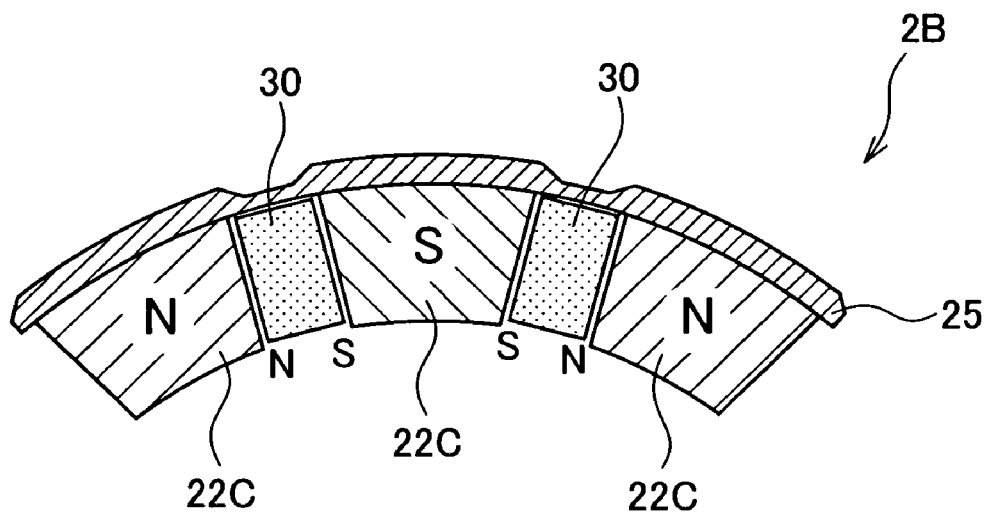
FIG. 6 is a cross-sectional view showing part of a rotor according to the fourth embodiment of the invention.

FIG. 6 shows part of a rotor 2B according to the fourth embodiment of the invention.

As shown in FIG. 6, the rotor 2B includes a plurality of permanent magnets 30 each of which is interposed between a circumferentially adjacent pair of the magnetic pole claws 22C of the first and second magnetic pole cores 22.

More specifically, each of the permanent magnets 30 is interposed between the pair of the magnetic pole claws 22C so that the north pole of the permanent magnet 30 faces one of the pair of the magnetic pole claws 22C which is magnetized to be north, while the south pole of the same faces the other magnetic pole claw 22C which is magnetized to be south.

With the above arrangement of the permanent magnets 30, it is possible to reduce magnetic flux leakage between the magnetic pole claws 22C of the first and second magnetic pole cores 22. Consequently, with the reduction in the magnetic flux leakage, it is possible to increase the output power of the alternator 1.

While the above particular embodiments of the invention have been shown and described, it will be understood by those skilled in the art that various modifications, changes, and improvements may be made without departing from the spirit of the invention.

For example, the annular core 25 of the first embodiment may be further heat-treated so that wall portions of the annular core 25 which respectively define the bottoms of the recesses 25B have a lower magnetic permeability than wall portions of the annular core 25 which respectively define the protrusions 25A.

With the lower magnetic permeability, it is possible to further effectively reduce leakage magnetic flux flowing inside the annular core 25 in the circumferential direction of the rotary shaft 21, thereby further increasing the output power of the alternator 1.

Moreover, the stator 3 of the first embodiment may be modified to include first and second groups of slots formed in the stator core 31 and first and second three-phase stator windings 32. The slots of the first group are spaced in the circumferential direction of the rotary shaft 21 at the same pitch as the magnetic pole claws 22C of the first and second magnetic pole cores 22. The slots of the second group are spaced in the circumferential direction of the rotary 21 with a difference in electrical angle between each circumferentially adjacent pair of one of the slots of the first group and one of the slots of the second group being equal to 30°. The first three-phase stator winding 32 is so wound around the stator core 31 as to be received in the slots of the first group, and the second three-phase stator winding 32 is so wound around the stator core 31 as to be received in the slots of the second group. Electric power is induced in and output from each of the first and second three-phase stator windings 32.

With the above configuration of the stator 3, it is possible to further effectively reduce fluctuation in magnetic flux transferred between the rotor 2 and the stator 3 during rotation of the rotor 2. Consequently, it is possible to further effectively reduce the magnetic noise caused by the fluctuation in the magnetic flux, thereby further improving the quietness of the alternator 1.

What is claimed is:

1. An automotive alternator comprising:

a stator including a stator core and a stator winding wound around the stator core; and a rotor surrounded by the stator, the rotor including a rotary shaft, a pair of first and second magnetic pole cores, a field winding, and an annular core, each of the first and second magnetic pole cores having a hollow cylindrical boss portion, a disc portion, and a plurality of magnetic pole claws, the boss portion being fit on the rotary shaft so as to rotate along with the rotary shaft, the disc portion extending radially outward from an axially outer part of the boss portion, each of the magnetic pole claws axially extending from a radially outer part of the disc portion, the magnetic pole claws of the first magnetic pole core being interleaved with the magnetic pole claws of the second magnetic pole core, the field winding being wound around both the boss portions of the first and second magnetic pole cores so that the field winding is surrounded by the boss portions, disc portions, and magnetic pole claws of the magnetic pole cores, the annular core being disposed to completely cover radially outer peripheries of all the magnetic pole claws of the first and second magnetic pole cores, the annular core having, on an outer surface thereof, a plurality of protrusions, a plurality of recesses, and a plurality of slopes, each of the protrusions being so formed and located as to be coincident with a corresponding one of the magnetic pole claws of the first and second magnetic pole cores in a circumferential direction of the rotary shaft, each of the recesses being alternately formed with the protrusions so as to be coincident with a corresponding one of air gaps formed between the magnetic pole claws of the first and second magnetic pole cores in the circumferential direction of the rotary shaft, each of the slopes being inclined to a radial direction of the rotary shaft and connecting a circumferentially adjacent pair of one of the protrusions and one of the recesses.

2. The automotive alternator as set forth in claim 1, wherein the annular core is made of a laminate that is formed by laminating a plurality of soft magnetic lamination sheets in an axial direction of the annular core.

3. The automotive alternator as set forth in claim 1, wherein the annular core has, for each of the recesses, at least one through-hole that penetrates a wall portion of the annular core, which defines a bottom of the recess, in the axial direction of the annular core.

4. The automotive alternator as set forth in claim 1, wherein the rotor further includes a plurality of permanent magnets, each of which is interposed between a circumferentially adjacent pair of the magnetic pole claws of the first and second magnetic pole cores so as to reduce magnetic flux leakage between the pair of the magnetic pole claws.

5. The automotive alternator as set forth in claim 1, wherein wall portions of the annular core which respectively define bottoms of the recesses have a lower magnetic permeability than wall portions of the annular core which respectively define the protrusions.

6. The automotive alternator as set forth in claim 1, wherein each of the magnetic pole claws of the first and second magnetic pole cores tapers from the disc portion connecting therewith in the axial direction of the rotary shaft, and each of the protrusions of the annular core also tapers in the same direction as the corresponding one of the magnetic pole claws of the first and second magnetic pole cores.

7. The automotive alternator as set forth in claim 1, wherein: the stator core has first and second groups of slots formed therein, and the stator winding comprises first and second stator windings;

the slots of the first group are spaced in the circumferential direction of the rotary shaft at the same pitch as the magnetic pole claws of the first and second magnetic pole cores, and the slots of the second group are spaced in the circumferential direction with a difference in electrical angle between each circumferentially adjacent pair of one of the slots of the first group and one of the slots of the second group being equal to 30°; and the first stator winding is so wound around the stator core as to be received in the slots of the first group, and the second stator winding is so wound around the stator core as to be received in the slots of the second group.

* * * * *